US011933486B2

(12) United States Patent
Makino et al.

(10) Patent No.: US 11,933,486 B2
(45) Date of Patent: Mar. 19, 2024

(54) LIGHTING DEVICE AND IMAGE READING APPARATUS

(71) Applicants: Hideyo Makino, Tokyo (JP); Michihito Ohashi, Kanagawa (JP); Yohhei Watanabe, Kanagawa (JP); Kohei Shimbo, Kanagawa (JP)

(72) Inventors: Hideyo Makino, Tokyo (JP); Michihito Ohashi, Kanagawa (JP); Yohhei Watanabe, Kanagawa (JP); Kohei Shimbo, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/321,158

(22) Filed: May 22, 2023

(65) Prior Publication Data

US 2023/0383924 A1    Nov. 30, 2023

(30) Foreign Application Priority Data

May 25, 2022    (JP) .................. 2022-085230

(51) Int. Cl.
| | |
|---|---|
| *F21V 5/04* | (2006.01) |
| *F21S 4/28* | (2016.01) |
| *F21V 19/00* | (2006.01) |
| *F21V 17/12* | (2006.01) |

(52) U.S. Cl.
CPC ................ *F21V 5/043* (2013.01); *F21S 4/28* (2016.01); *F21V 19/0015* (2013.01); *F21V 17/12* (2013.01)

(58) Field of Classification Search
CPC ...... F21V 5/043; F21V 19/0015; F21V 17/12; F21S 4/28
See application file for complete search history.

(56) References Cited

U.S. PATENT DOCUMENTS

| | | | | |
|---|---|---|---|---|
| 9,250,560 | B1* | 2/2016 | Judd | G03G 15/043 |
| 10,097,722 | B1* | 10/2018 | Nakamura | H04N 1/0473 |
| 10,865,961 | B1* | 12/2020 | Simon | F21V 5/043 |
| 2005/0161583 | A1* | 7/2005 | Matsumoto | G02B 3/0037 |
| | | | | 250/208.1 |

(Continued)

FOREIGN PATENT DOCUMENTS

| | | | |
|---|---|---|---|
| CN | 205824776 U | * | 12/2016 |
| EP | 1102469 | | 5/2001 |

(Continued)

OTHER PUBLICATIONS

Extended European Search Report for 23173889.9 dated Oct. 19, 2023.

*Primary Examiner* — Zheng Song
*Assistant Examiner* — Glenn D. Zimmerman
(74) *Attorney, Agent, or Firm* — IPUSA, PLLC (57) ABSTRACT

A lighting device includes a linear light source extending in a first direction and configured to emit light in a second direction intersecting the first direction to an object; a rod lens apart from the linear light source in the second direction and extending in the first direction, the rod lens configured to transmit the light emitted from the linear light source; and a support portion supporting the rod lens and having: a first surface extending in a third direction intersecting the second direction; and a second surface extending in a fourth direction intersecting the second direction and the third direction. The rod lens is in contact with each of the first surface and the second surface.

10 Claims, 11 Drawing Sheets

(56) References Cited

U.S. PATENT DOCUMENTS

| | | |
|---|---|---|
| 2013/0329436 A1* | 12/2013 | Suzuki .................. F21V 15/013 29/451 |
| 2015/0293487 A1 | 10/2015 | Takenaga et al. |
| 2016/0047966 A1* | 2/2016 | Schenkl ............... G02B 6/0068 362/609 |
| 2016/0090256 A1 | 3/2016 | Nakayama et al. |
| 2016/0100072 A1 | 4/2016 | Kobayashi et al. |
| 2016/0103404 A1 | 4/2016 | Hasegawa |
| 2017/0097601 A1 | 4/2017 | Takenaga et al. |
| 2017/0131671 A1 | 5/2017 | Nishimura et al. |
| 2017/0176908 A1 | 6/2017 | Kobayashi et al. |
| 2018/0152584 A1 | 5/2018 | Sugiyama |
| 2018/0364627 A1 | 12/2018 | Kobayashi et al. |
| 2019/0163112 A1 | 5/2019 | Nikaku et al. |
| 2020/0301326 A1 | 9/2020 | Yamazaki et al. |
| 2021/0165355 A1 | 6/2021 | Yamazaki et al. |
| 2021/0166096 A1 | 6/2021 | Yamazaki et al. |
| 2021/0168253 A1 | 6/2021 | Nakayama et al. |
| 2023/0024199 A1 | 1/2023 | Makino et al. |

FOREIGN PATENT DOCUMENTS

| | | | |
|---|---|---|---|
| EP | 2911379 | 8/2015 | |
| JP | 2010050689 A * | 3/2010 | ......... H04N 1/00846 |
| JP | 2011-082969 | 4/2011 | |
| JP | 2016-075856 | 5/2016 | |
| WO | WO-2013161115 A1 * | 10/2013 | ........... G02B 6/0005 |
| WO | WO-2017146030 A1 * | 8/2017 | .............. F21V 17/12 |

* cited by examiner

| PREDICTED INFLUENCE ON CHARACTERISTICS WHEN DIAMETER (ΔR) TOLERANCE OF ROD LENS IS FIVE TIMES GREATER | | | | | |
|---|---|---|---|---|---|
| ITEM | TARGET DEGREE | CONVENTIONAL DEGREE | INCREASED DEGREE | EVALUATION | REMARKS |
| MAIN-SCANNING MINIMUM ILLUMINANCE RATIO | 0.9 OR GREATER | 0.97 TO 0.97 | 0.97 TO 0.98 | A | |
| HEIGHT RANGE WITH ILLUMINANCE RATIO OF 0.99 OR GREATER | ±0.25 OR GREATER | −0.26 TO 0.33 | −0.26 TO 0.33 | A | |

| PREDICTED INFLUENCE ON CHARACTERISTICS WHEN SHIFT AMOUNT (ΔV) OF ROD LENS ALONG OPTICAL AXIS IS FIVE TIMES GREATER | | | | | |
|---|---|---|---|---|---|
| ITEM | TARGET DEGREE | CONVENTIONAL DEGREE | INCREASED DEGREE | EVALUATION | REMARKS |
| MAIN-SCANNING MINIMUM ILLUMINANCE RATIO | 0.9 OR GREATER | 0.97 TO 0.97 | 0.97 TO 0.98 | A | |
| HEIGHT RANGE WITH ILLUMINANCE RATIO OF 0.99 OR GREATER | ±0.25 OR GREATER | −0.26 TO 0.33 | −0.26 TO 0.33 | A | |

| PREDICTED INFLUENCE ON CHARACTERISTICS WHEN SHIFT AMOUNT (ΔW) OF ROD LENS IN TRAVERSE DIRECTION IS FIVE TIMES GREATER | | | | | |
|---|---|---|---|---|---|
| ITEM | TARGET DEGREE | CONVENTIONAL DEGREE | INCREASED DEGREE | EVALUATION | REMARKS |
| MAIN-SCANNING MINIMUM ILLUMINANCE RATIO | 0.9 OR GREATER | 0.97 TO 0.97 | 0.97 TO 0.98 | A | |
| HEIGHT RANGE WITH ILLUMINANCE RATIO OF 0.99 OR GREATER | ±0.25 OR GREATER | −0.26 TO 0.33 | 0 | C | |

LIGHTING DEVICE AND IMAGE READING APPARATUS

CROSS-REFERENCE TO RELATED APPLICATIONS

This patent application is based on and claims priority pursuant to 35 U.S.C. § 119(a) to Japanese Patent Application No. 2022-085230, filed on May 25, 2022, in the Japan Patent Office, the entire disclosure of which is hereby incorporated by reference herein.

BACKGROUND

Technical Field

The present disclosure relates to a lighting device and an image reading apparatus incorporating the lighting device.

Related Art

There has been an image reading apparatus including a lighting device that emits light to a document surface of a document and a reader that reads light reflected from the document surface. The lighting device includes multiple white light-emitting diode (LED) light sources for emitting light, and a rod lens for condensing the light emitted from the white LED light sources.

SUMMARY

An embodiment of the present disclosure provides a lighting device including: a linear light source extending in a first direction and configured to emit light in a second direction intersecting the first direction to an object; a rod lens apart from the linear light source in the second direction and extending in the first direction, the rod lens configured to transmit the light emitted from the linear light source; and a support portion supporting the rod lens and having: a first surface extending in a third direction intersecting the second direction; and a second surface extending in a fourth direction intersecting the second direction and the third direction. The rod lens is in contact with each of the first surface and the second surface.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure provide a lighting device that maintains a higher level of accuracy in the relative position between a light source and a rod lens while reducing the number of person-hours needed to position the elements.

Hereinafter, an embodiment of the present invention will be described with reference to the drawings. In drawings, three directions orthogonal to each other: an X-axis direction, a Y-axis direction, and a Z-axis direction are indicated by arrows as appropriate.

The Y-axis direction is a direction in which a sheet 100 is conveyed, i.e., a conveyance direction of the sheet 100.

The X-axis direction intersects the conveyance direction of the sheet 100 and coincides with the width direction of the sheet 100. The Z-axis direction coincides with the thickness direction of the sheet 100.

Colorimeter

Figure 1:
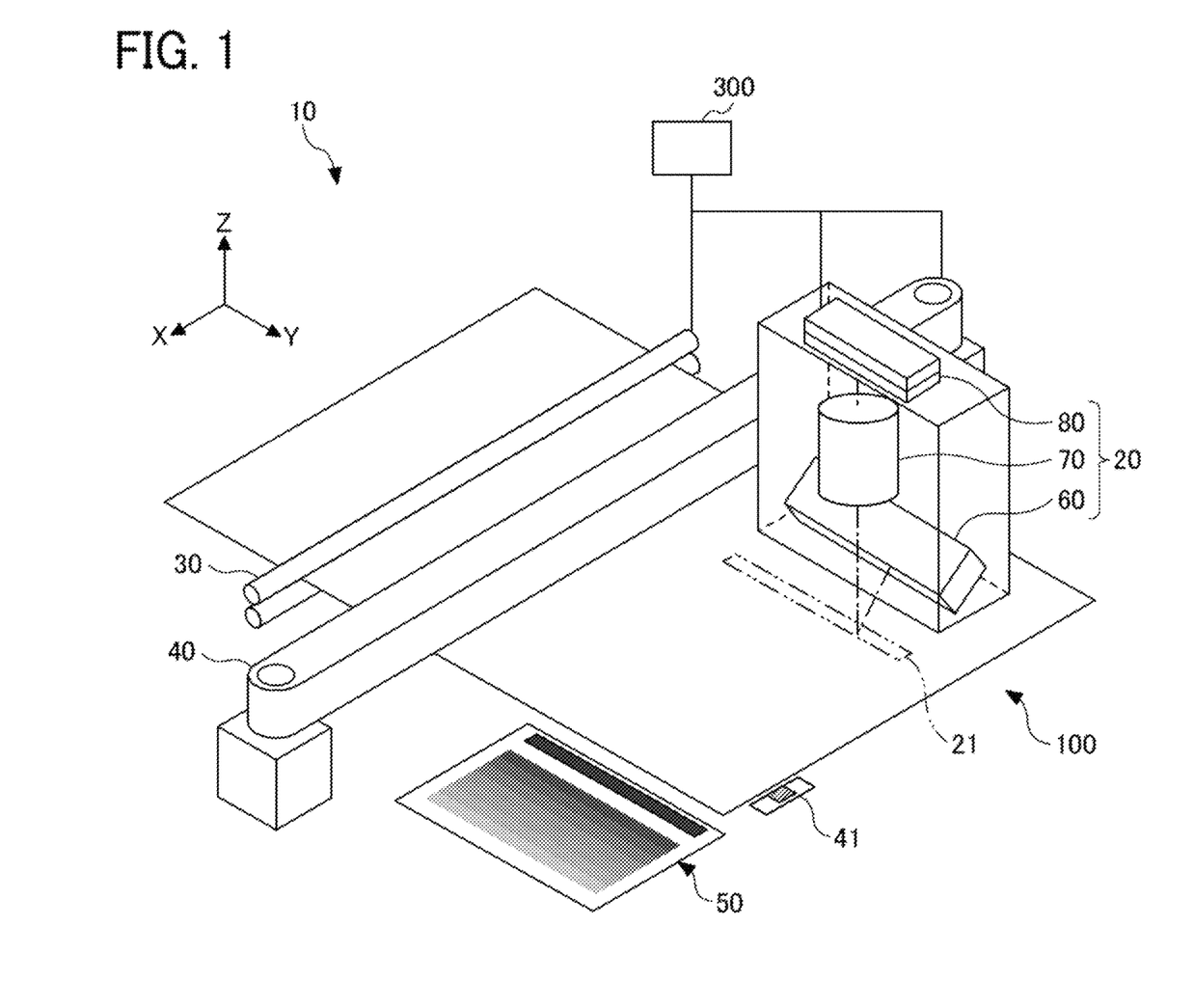
FIG. 1 is a perspective view of a colorimeter according to an embodiment.

FIG. 1 is a perspective view of a colorimeter according to an embodiment of the present disclosure. A colorimeter 10 in FIG. 1 includes a color data obtainer 20, a sheet conveyor 30, a sheet sensor 41, a color data obtainer conveyor 40, a color chart for correction 50, and a controller 300.

The color data obtainer 20 is an example of an image reader (or an image reading apparatus). The controller 300 may be a controller of an image forming apparatus incorporating the image reader.

The controller 300 controls the operation of the colorimeter 10.

The sheet conveyor 30 conveys the sheet 100 in the Y-axis direction at a constant speed. The sheet conveyor 30 includes, for example, a nip roller having two rollers.

The sheet conveyor 30 conveys the sheet 100 by rotating the nip roller with its two rollers nipping the sheet 100.

The sheet sensor 41 detects the presence of the sheet 100 at a predetermined position. The sheet sensor 41 detects the presence of the sheet 100 in a color-data acquisition area 21, which is a predetermined position, for example.

For example, the sheet sensor 41 emits light to the sheet 100 with light and detects light reflected from the sheet 100 with, for example, a photodiode. Based on the output from the sheet sensor 41, the colorimeter 10 detects the presence of the sheet 100 at a position within the color-data acquisition area 21 from which the color data obtainer 20 acquires color data.

The color data obtainer conveyor 40 conveys the color data obtainer 20 in the X-axis direction of the sheet 100. The color data obtainer conveyor 40 may include, for example, a conveyance stage including a ball screw and a guide.

The color chart for correction 50 according to the present embodiment is used to correct the transformation matrix that is used to compute the spectral characteristics.

The colorimeter 10 may simultaneously acquire spectral characteristics at multiple positions in the Y-axis direction in the color-data acquisition area 21 of the sheet 100.

Color Data Obtainer

Figure 2:
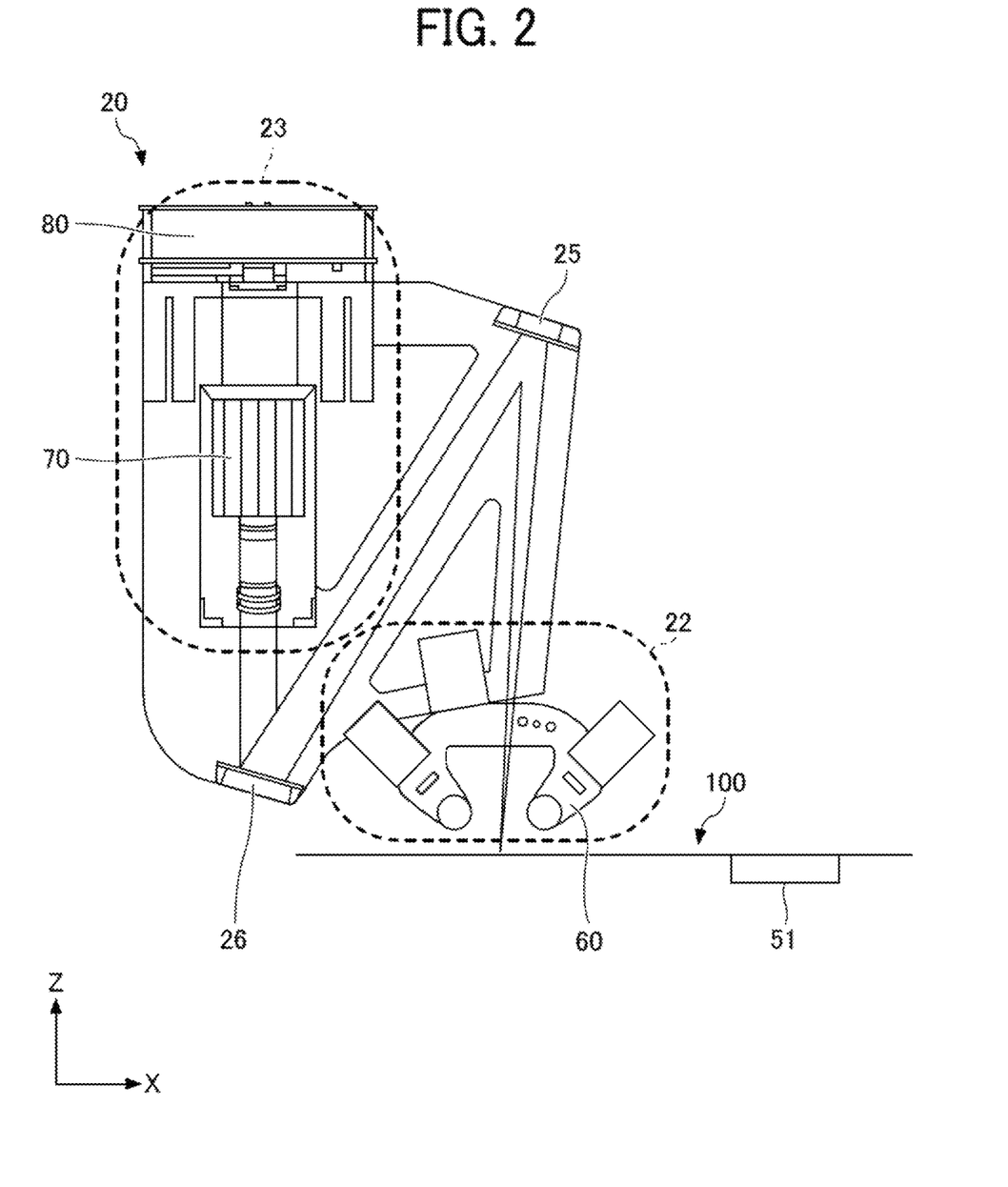
FIG. 2 is a diagram of a color data acquisition obtainer.

FIG. 2 is a diagram of a color data acquisition obtainer. As illustrated in FIGS. 1 and 2, the color data obtainer 20 according to the present embodiment includes a linear light source 60, a reduction imaging lens 70, and a spectroscopic unit 80.

In FIG. 2, the color data obtainer 20 includes an illuminator 22 and a light receiver 23. The illuminator 22 includes the linear light source 60. The light receiver 23 includes the reduction imaging lens 70 and the spectroscopic unit 80.

The linear light source 60 emits linear light to the color-data acquisition area 21. The color-data acquisition area 21 is an example of a reference surface of an object.

The linear light source 60 emits light to the color-data acquisition area 21 in a direction tilted by, for example, 45 degrees with respect to the X-axis direction when viewed in the Y-axis direction.

The direction in which the linear light source 60 emits light is an example of the direction parallel to the optical axis. The tilt angle of the light emitted from the linear light source 60 is not limited to 45 degrees and may be other angles.

The Y-axis direction is an example of a first direction.
The X-axis direction is an example of a third direction.
The direction parallel to the optical axis is an example of a second direction.

In at least one example, the linear light source 60 includes a white LED array. The "LED" is an abbreviation for light emitting diode. The white LED array has an intensity across the substantially entire spectrum of visible light.

The linear light source 60 is not limited to one including an LED, and may include, for example, a fluorescent lamp such as a cold-cathode tube and a lamp light source.

In at least one example, the linear light source 60 emits light in a wavelength range for spectral separation, with a uniform intensity over the entire color-data acquisition area 21. In some examples, the illuminator 22 includes a collimator lens that concentrates light emitted from the linear light source 60. The collimator lens concentrates the light emitted from the linear light source 60 and irradiates the sheet 100 with parallel or converging light.

The reduction imaging lens 70 has its optical axis parallel to the Z-axis direction. The reduction imaging lens 70 forms an image with light (or a light flux) reflected from the sheet 100, can form an image of reflected light from the sheet 100 on an incident surface of the spectroscopic unit 80 at a predetermined magnification.

In the present embodiment, the image-side telecentric characteristics are added to the reduction imaging lens 70. By adding the image-side telecentric characteristics to the reduction imaging lens 70, the chief ray of the light flux incident on the imaging plane can easily be made approximately parallel to the optical axis.

In the present embodiment, the reduction imaging lens 70 is composed of multiple lenses. A rod lens can be employed as the collimating lens.

The image-side telecentric characteristic may not be added to the reduction imaging lens 70. The chief ray of the light flux incident on the imaging plane is easily made substantially parallel to the optical axis by adjusting, for example, the relative positions of each pinhole of a pinhole array and each lens of a lens array according to the tilt of the chief ray at varying positions of the imaging plane.

The spectroscopic unit 80 serves to distribute the diffuse reflection light of the light emitted to the sheet 100, receive the distributed light, and output a signal in response to the reception of the distributed light.

The optical system as illustrated in FIG. 1 is a so-called 45/0 optical system in which the illumination light emitted from the linear light source 60 is incident on the sheet 100 at approximately 45 degrees and the spectroscopic unit 80 receives the light diffusely reflected by the sheet 100 in the vertical direction.

However, the configuration of the optical system is not limited to that in FIG. 1. For example, the optical system according to the present embodiment may be a so-called 0/45 optical system in which the illumination light emitted from the linear light source 60 is incident on the sheet 100 at 90 degrees and the spectroscopic unit 80 receives the light diffusely reflected by the sheet 100 at 45 degrees.

In at least one example, the color data obtainer 20 include a white reference plate 51. The spectroscopic unit 80 may include a drive circuit, a charge-coupled device (CCD), and a spectroscopic element. In at least one example, the light receiver 23 may include a Peltier temperature control system, a scanner lens, and a ultra violet (UV)/infra red (IR) cut filter. Further, in at least one example, the color data obtainer 20 includes reflecting mirrors 25 and 26.

Lighting Device

Figure 3:
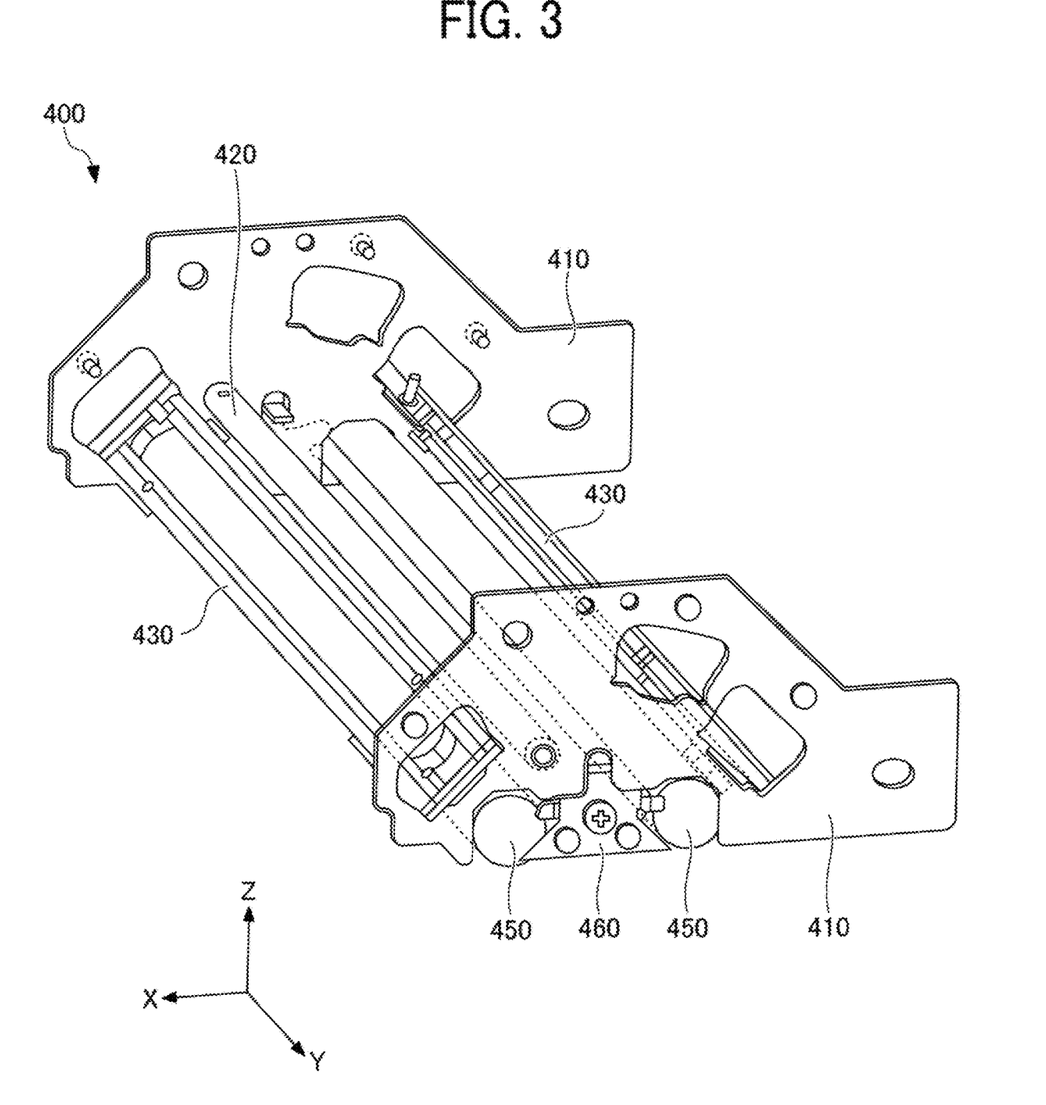
FIG. 3 is a diagram of a lighting device from above.
Figure 4:
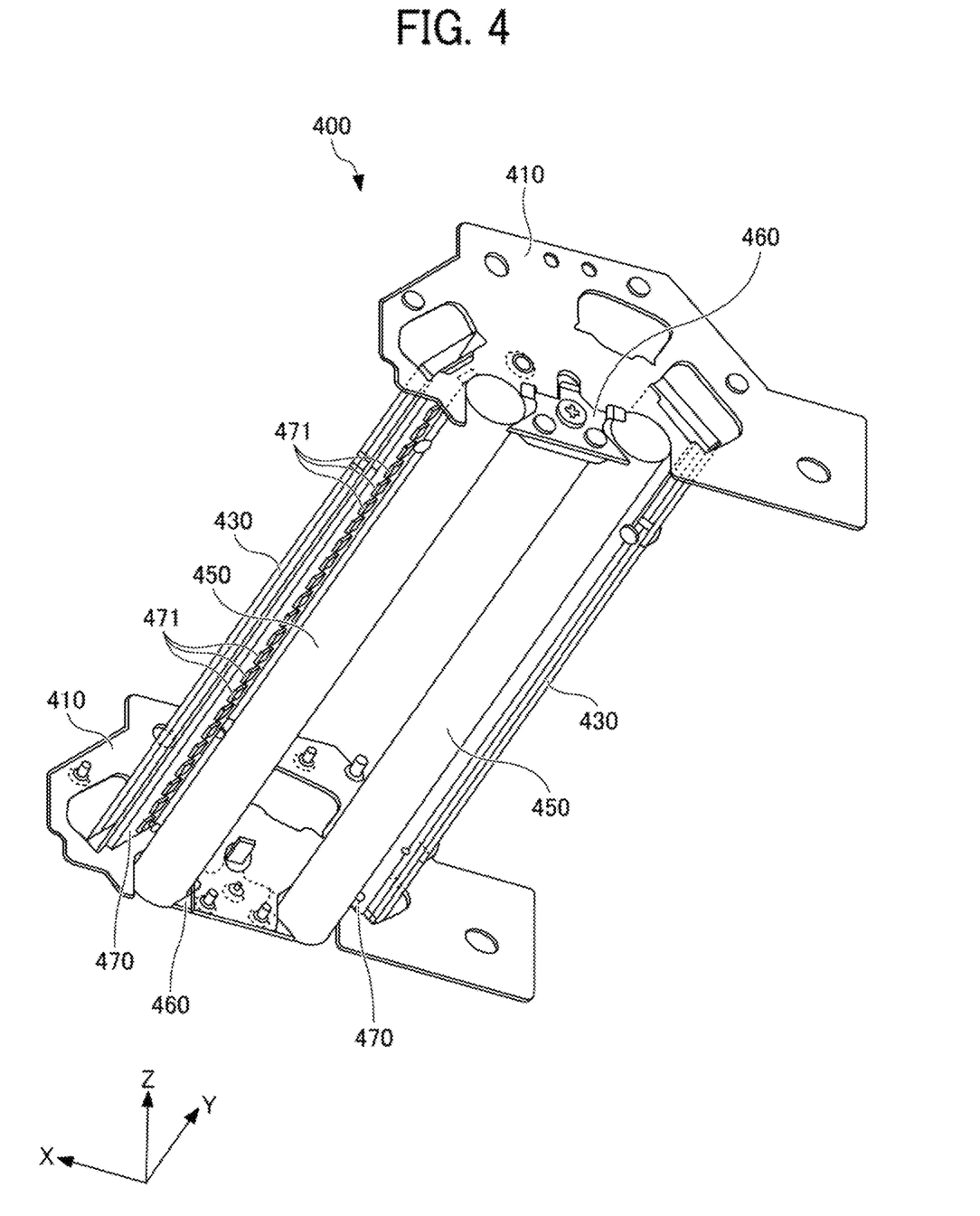
FIG. 4 is a perspective view of the lighting device in FIG. 3 from below.
Figure 5:
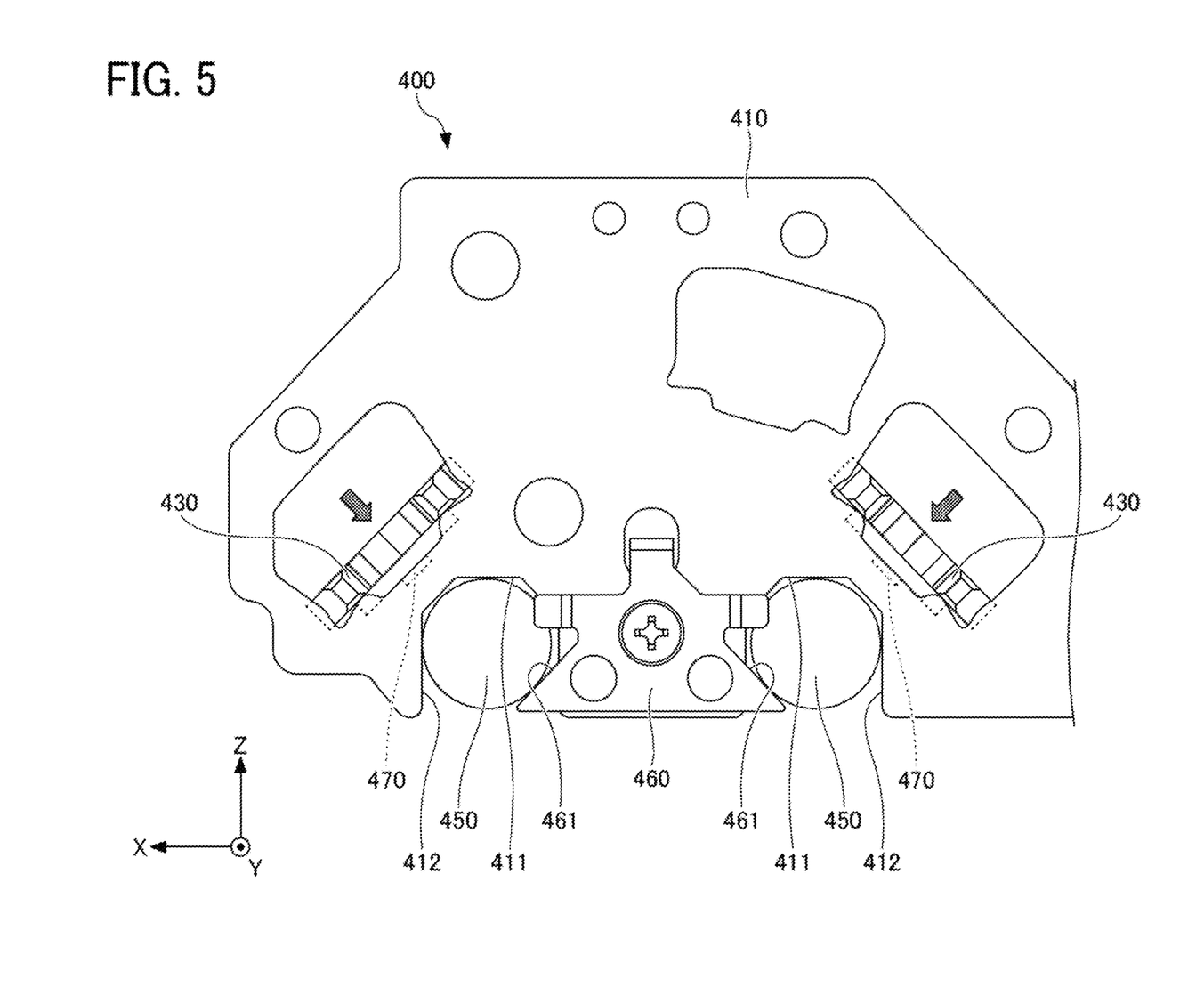
FIG. 5 is a side view of the lighting device in FIG. 1.

A lighting device 400 is described with reference to FIGS. 3 to 5. FIG. 3 is a diagram of the lighting device 400 from above. FIG. 4 is a perspective view of the lighting device 400 in FIG. 3 from below. FIG. 5 is a side view of the lighting device 400 in FIG. 1. The color data obtainer 20 includes the lighting device 400 as the linear light source 60.

The lighting device 400 includes side plates 410, a shaft 420, metal plates 430, rod lenses 450, rod lens retainers 460, and white LED boards 470. Each side plate 410 is an example of a support portion. Each white LED board 470 is an example of a linear light source.

As illustrated in FIGS. 3 and 4, the lighting device 400 includes a pair of side plates 410. The pair of side plates 410 are apart from each other in the Y-axis direction. The thickness direction of the side plate 410 is parallel to the Y-axis direction. The shaft 420 extends in the Y-axis direction and couples the pair of side plates 410 to each other.

As illustrated in FIGS. 4 and 5, the white LED boards 470 are fixed to the metal plates 430. A white LED array is mounted on each white LED board 470. The white LED array includes multiple LEDs 471 arranged in the Y-axis direction.

For example, the white LED boards 470 are fixed to the metal plates 430 with a screw. Heat generated from each white LED board 470 is transferred to its corresponding metal plate 430. The metal plates 430 each radiate the transferred heat.

For example, a heat sink made of aluminum may be attached to each metal plate 430. The heat of each metal plate 430 is radiated by being transferred to its heat sink.

The longitudinal direction of each metal plate 430 is aligned with the Y-axis direction. Both end portions of each metal plate 430 in the longitudinal direction are supported by its corresponding pair of side plates 410. Each side plate 430 has openings into which the metal plates 430 are respectively fitted. The side surfaces of each metal plate 430 may be in contact with the peripheral edge of its corresponding openings of the side plates 410.

The side surfaces of each metal plate 430 are surfaces parallel to the thickness direction of the metal plate 430 when viewed in the Y-axis direction. The paired side surfaces of each metal plate 430 are opposed to each other in a vertical direction orthogonal to the longitudinal direction of the metal plates 430.

The bottom surface of each metal plate 430 may be in contact with the peripheral edge of the opening of the side plate 410. The bottom surface of each metal plate 430 is closer to the sheet 100 than the other surfaces intersecting with the thickness direction when viewed in the Y-axis direction. The white LED board 470 is attached to the bottom surface of the metal plate 430.

In at least one example, the lighting device 400 includes a pressing member that presses the bottom surface of the metal plate 430 in the direction along the optical axis. A spring member may be used as the pressing member. The direction along the optical axis may be an emission direction in which the white LED boards 470 emit light. The pressing member is attached to the side plate 410 to press the metal plate 430 in the direction along the optical axis.

The direction along the optical axis is an example of a second direction.

Each rod lens 450 has a bar shape and extends in the Y-axis direction. Each rod lens 450 transmits light in a diameter direction intersecting the longitudinal direction of the rod lens 450. Each rod lens 450 may be made of, for example, acrylic resin (polymethyl methacrylate resin (PMMA)). The acrylic resin is lightweight and excellent in light transmittance. Each rod lens 450 may be formed of other materials.

Both end portions of each rod lens 450 are supported by the pair of side plates 410. Each side plate 410 has a notch into which the rod lens 450 is fitted. Each rod lens 450 is disposed away from its corresponding white LED board 470 in the direction along the optical axis when viewed in the Y-axis direction.

The notch in which the rod lens 450 is disposed is formed so as to penetrate the side plate 410 in the Y-axis direction. The notch may be formed so as to be recessed from the end portion of the side plate 410 in the Z-axis direction when viewed in the Y-axis direction. The notch may be formed by a peripheral edge extending in the Z-axis direction and a peripheral edge extending in the X-axis direction.

Each side plate 410 has a lens contact surface 411 and a lens contact surface 412, both of which is in contact with the side surface of the rod lenses 450. The lens contact surfaces 411 and 412 form the peripheral edge of a notch into which the rod lens 450 is fitted.

The lens contact surface 411 is an example of a first surface.

The lens contact surface 412 is an example of a second surface.

Figure 6:
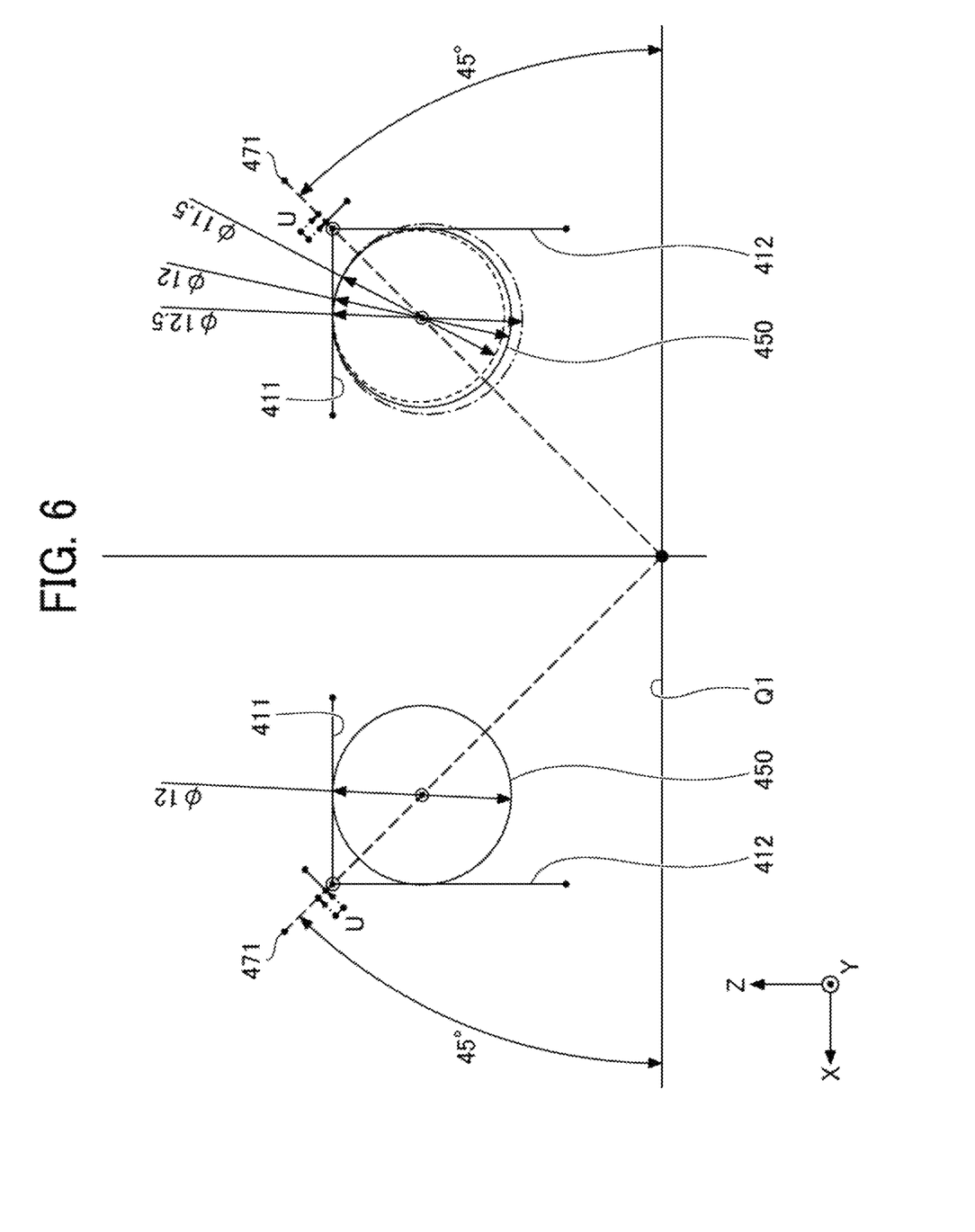
FIG. 6 is a side view of a rod lens and lens contact surfaces.

FIG. 6 is a side view of a rod lens and lens contact surfaces. As illustrated in FIG. 6, the lens contact surface 411 includes a surface intersecting the Z-axis direction and parallel with the X-axis direction when viewed in the Y-axis direction. The lens contact surface 411 is in contact with the rod lens 450 in the Z-axis direction. The rod lens 450 is in contact with the lens contact surface 411. This restricts the upward movement of the rod lenses 450. The Z-axis direction is an example of a fourth direction.

The lens contact surface 412 is formed so as to intersect with the lens contact surface 411 when viewed in the Y-axis direction. The lens contact surface 412 includes a surface intersecting the X-axis direction and parallel with the Y-axis direction when viewed in the Z-axis direction. The lens contact surface 412 is in contact with the rod lens 450 in the X-axis direction. The rod lens 450 is in contact with the lens contact surface 412. This restricts the X-axis directional movement of the rod lenses 450.

As illustrated in FIG. 5, the lighting device 400 includes multiple white LED boards 470. The multiple white LED boards 470 are disposed apart from each other in the X-axis direction. Similarly, the lighting device 400 includes multiple rod lenses 450. The multiple rod lenses 450 are apart from each other in the X-axis direction. As illustrated in FIG. 6, the lens contact surfaces 412 are respectively disposed outside the two rod lenses 450 in the X-axis direction.

Figure 7:
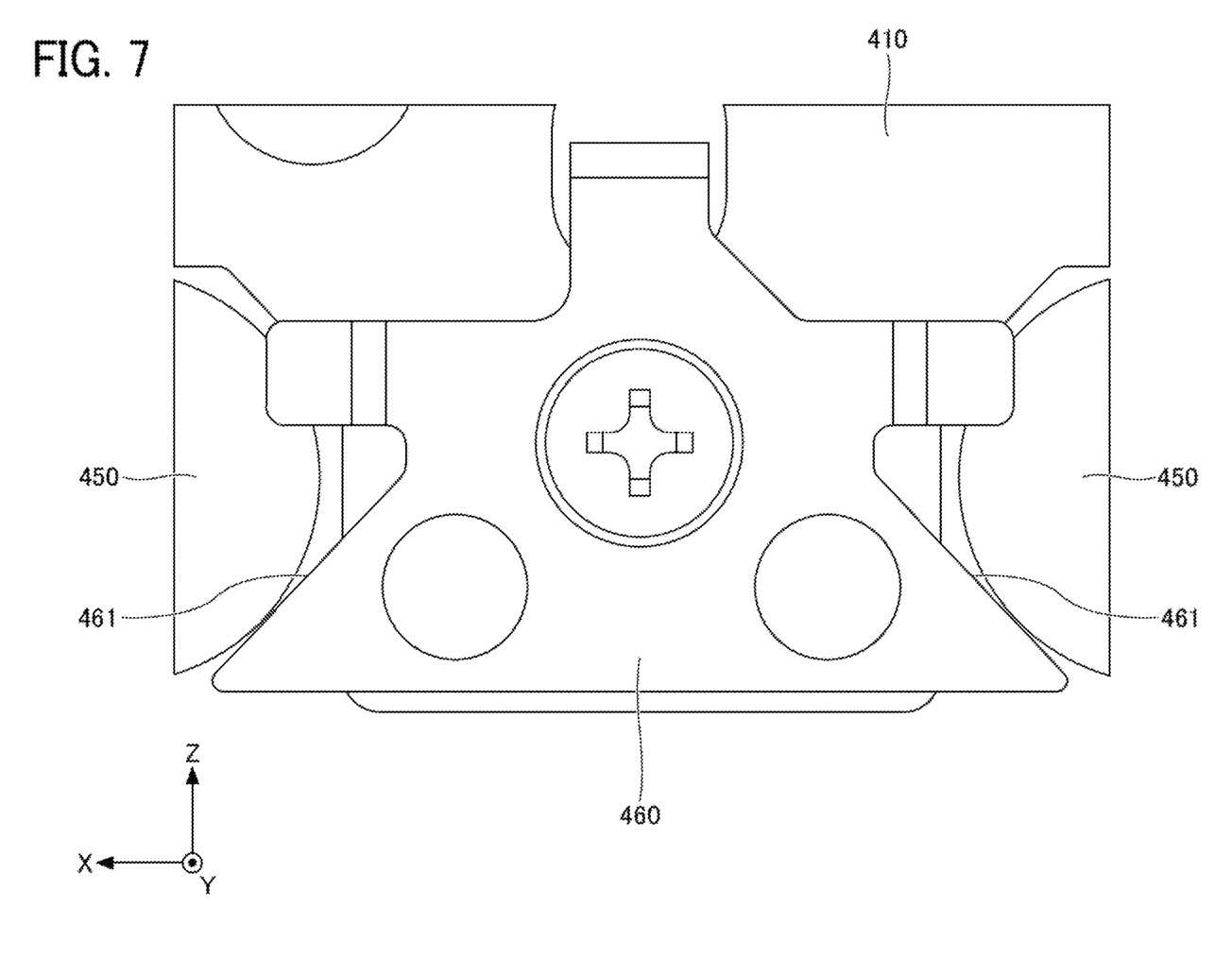
FIG. 7 is a side view of a rod lens retainer.

FIG. 7 is a side view of a rod lens retainer. The rod lens retainer 460 (or a lens retainer) as illustrated in FIG. 7 is attached to the side plate 410 by, for example, a screw. The rod lens retainer 460 has a plate shape, and the thickness direction of the rod lens retainer 460 is parallel to the Y-axis direction. The rod lens retainer 460 is disposed outside the side plate 410 in the Y-axis direction. When viewed in the Y-axis direction, the rod lens retainer 460 protrudes so as to overlap the notch in which the rod lens 450 is disposed.

The rod lens retainer 460 has lens contact surfaces 461 that respectively come into contact with the side surfaces of the rod lenses 450. Each lens contact surface 461 is an example of a third surface.

The lens contact surface 461 includes a surface intersecting the direction along the optical axis of the white LED board 470, and extends in a direction intersecting the X-axis direction and the Z-axis direction when viewed in the Y-axis direction. The lens contact surfaces 461 extend in a direction intersecting the lens contact surfaces 411 and 412 in FIG. 6.

Each rod lens 450 is in contact with the lens contact surfaces 411, 412, and 461 at different positions in the circumferential direction of that rod lens 450. The rod lens retainer 460 is disposed between the paired rod lenses 450 facing each other in the X-axis direction.

The lens contact surface 461 is formed so as to protrude on both sides of the rod lens retainer 460 in the X-axis direction. The rod lens retainer 460 is disposed to support the paired rod lenses 450 facing each other in the X-axis direction.

In at least one example, the lighting device 400 includes a pressing member that presses the rod lens retainer 460 against the rod lens 450. The pressing member includes, for example, a spring member.

Influences of Variations in Rod Lens Diameter

Figure 8:
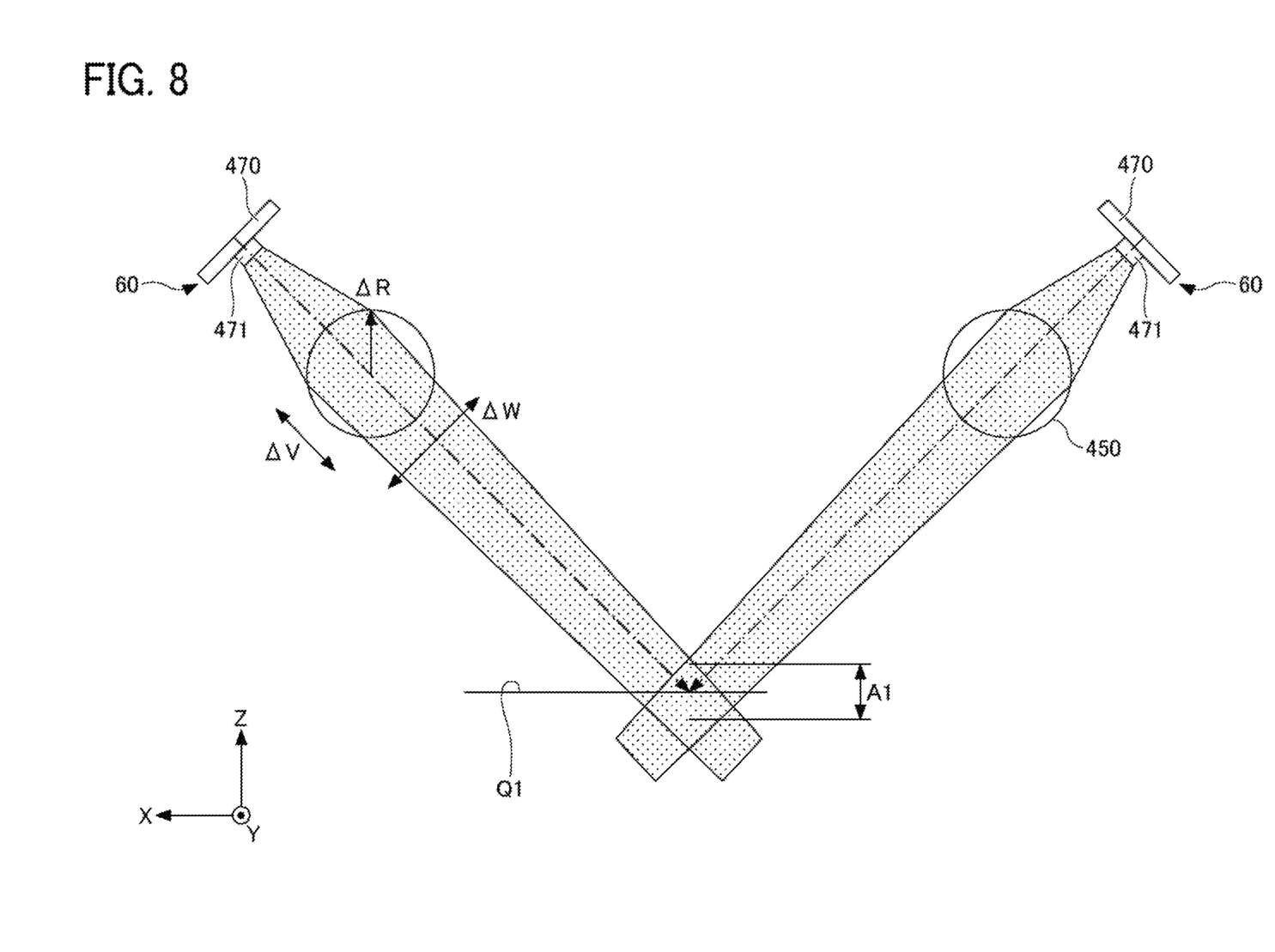
FIG. 8 is a side view of a lighting device, a measurement plane and a height range.
Figure 9:
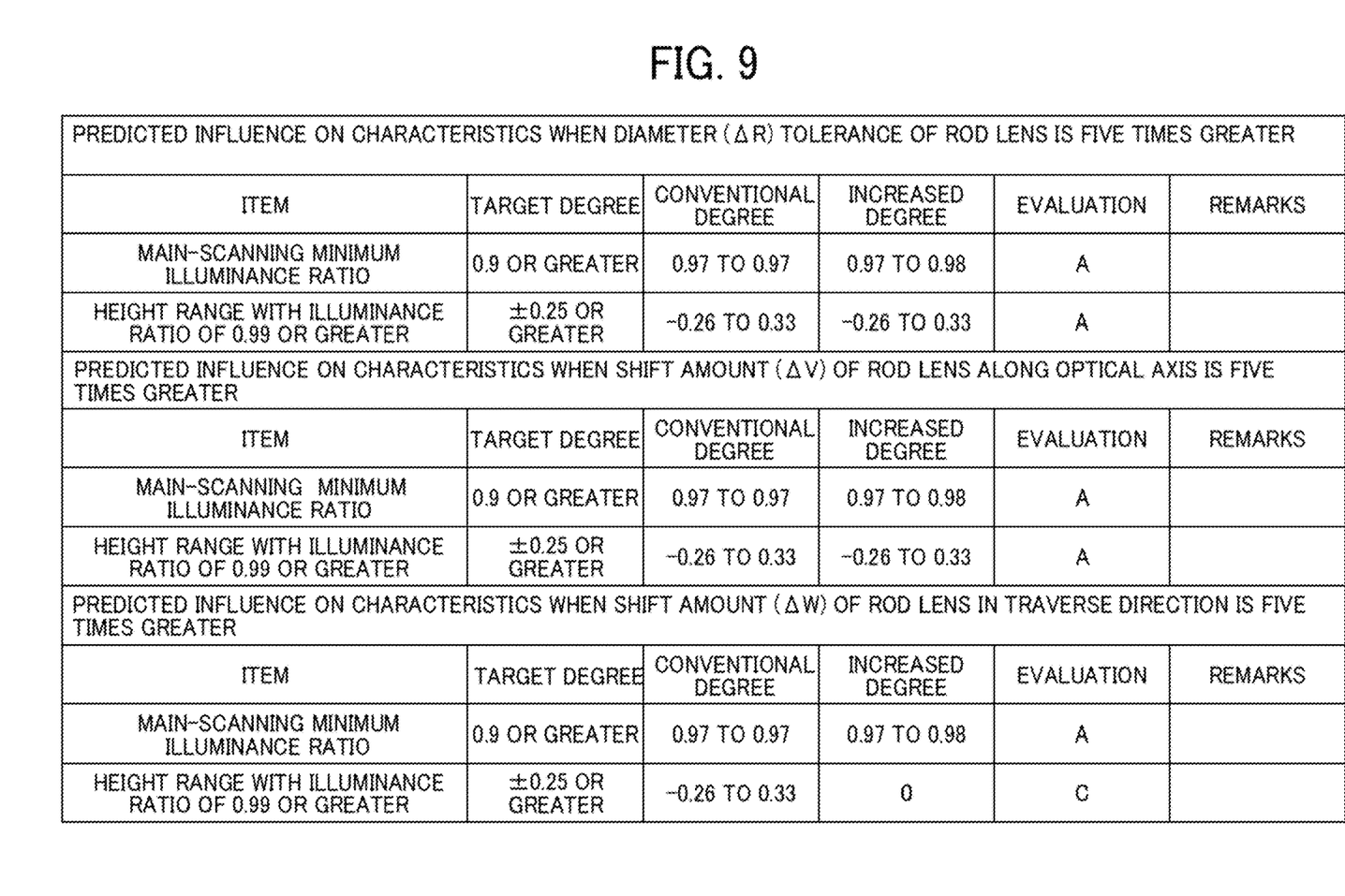
FIG. 9 is a table of a predicted influence due to the misalignment of the rod lens.
Figure 10:
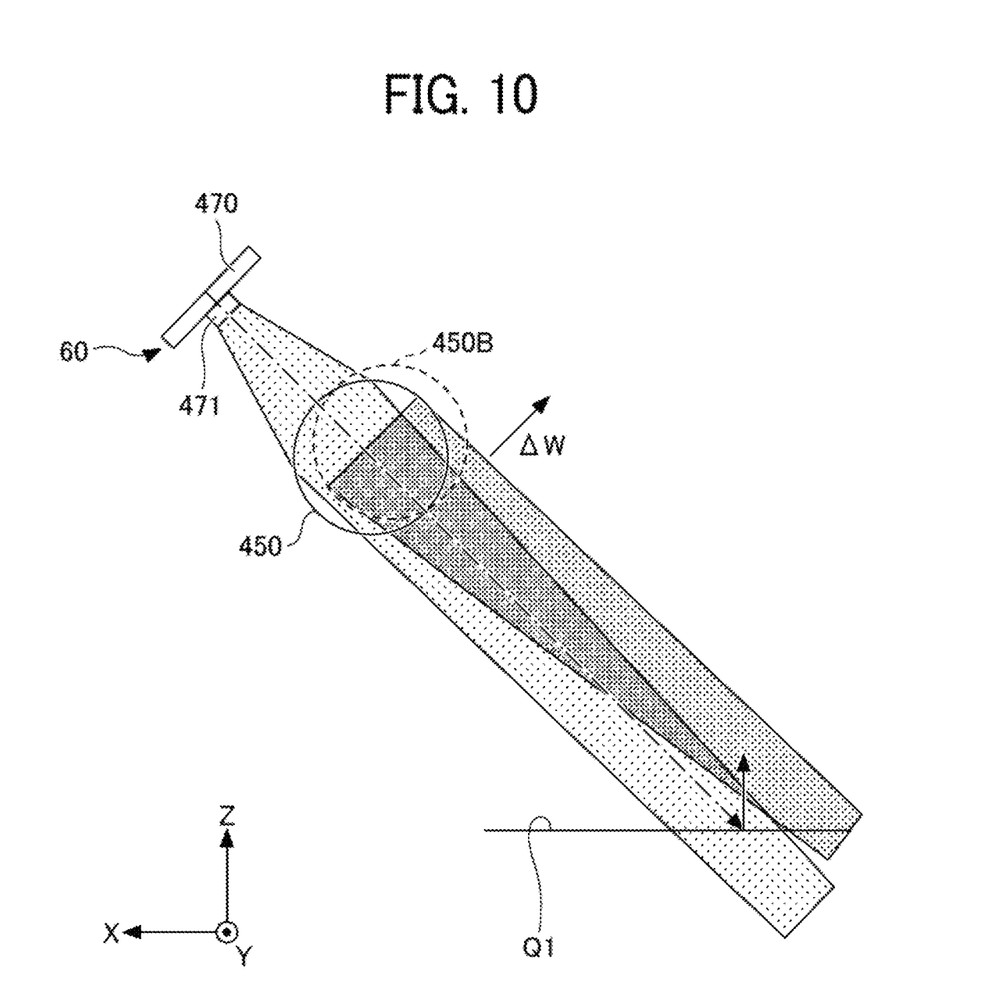
FIG. 10 is a side view of a misalignment of a rod lens.

The following describes the influences of variations in diameter between the rod lenses 450 due to their tolerances with reference to FIGS. 8 to 10. FIG. 8 is a side view of a lighting device, a measurement plane, and a height range. FIG. 9 is a table of predicted influences due to misalignment of the rod lens. FIG. 10 is a side view of a misalignment of a rod lens.

As illustrated in FIG. 8, the optical characteristics of the lighting device 400 might be influenced by the shift amount in the diameter direction $\Delta R$, the shift amount in the direction $\Delta V$ along the optical axis, and the shift amount in a direction $\Delta W$ orthogonal to the optical axis, which are caused by the variations in dimension between the rod lenses

450 due to their diameter tolerances. FIG. 9 indicates predicted influences on the optical characteristics when the tolerance in the diameter direction (ΔR) of the rod lens 450 is five times greater, predicted influence on the optical characteristics when the tolerance in the direction (ΔV) along the optical axis of the rod lens 450 is five times greater, and predicted influence on the optical characteristics when the tolerance in the direction (ΔW) orthogonal to the optical axis of the rod lens 450 is five times greater.

Five Times Tolerance in Diameter Direction (ΔR) of Rod Lens

The target value of the main-scanning minimum illuminance ratio is, for example, 0.9 or greater. The main-scanning minimum illuminance ratio is a ratio of main-scanning minimum illuminance value to the main-scanning maximum illuminance value (i.e., main-scanning minimum illuminance ratio=main-scanning minimum illuminance value/main-scanning maximum illuminance value). In "CONVENTIONAL DEGREE" in the table, the main-scanning minimum illuminance ratio is, for example, about 0.97. The structural difference between the "CONVENTIONAL DEGREE" and "INCREASED DEGREE" is the difference in the tolerance of the rod lens diameter. The tolerance of the rod lens diameters of "CONVENTIONAL DEGREE" is φ12±0.1 mm.

The tolerance of the rod lens diameters for "INCREASED DEGREE" is φ12±0.5 mm.

The main-scanning minimum illuminance ratio for "INCREASED DEGREE" was 0.97 or greater and 0.98 or less.

The evaluation was "A".

The evaluation "when the target value was satisfied" was "A", and the evaluation "when the target value was not satisfied" was "C".

The target value of the height range A1 for which the illuminance ratio is 0.99 or greater is ±0.25 mm or greater. In the Z-axis direction, the position of the measurement surface Q1 is set to "0". The measurement surface Q1 may be an image surface of the sheet 100. The case where the height range A1 is ±0.25 mm or greater refers to a range (i.e., a variation range) of 0.5 mm (=0.25 mm×2) or greater in which the position of the measurement surface Q1 varies. The thickness of the sheet 100 varies with the type of the sheet. For a sheet thickness ranging from 0.1 mm to 0.6 mm, the variation range is 0.5 mm. With the height range A1 of ±0.25 mm or greater, it is possible to handle sheets having different sheet thicknesses (0.1 mm to 0.6 mm) as described above. Alternatively, with the height range A1 of ±0.25 mm or greater, a stable illuminance ratio can be ensured even if the sheet 100 is lifted.

The height range A1 with an illuminance ratio of 0.99 or greater for the "CONVENTIONAL DEGREE" as indicated in Table of FIG. 9 is −0.26 mm and 0.33 mm or less. The height range A1 with an illuminance ratio of 0.99 or greater "INCREASED DEGREE" was −0.26 mm or greater and 0.33 mm or less. There was no change between "CONVENTIONAL DEGREE" and "INCREASED DEGREE". The evaluation was "A".

Five Times Tolerance in Direction Along Optical Axis (ΔV) of Rod Lens

The target value of the main-scanning minimum illuminance ratio is, for example, 0.9 or greater. In "CONVENTIONAL DEGREE" in table, the main-scanning minimum illuminance ratio is, for example, about 0.97. The main-scanning minimum illuminance ratio for "INCREASED DEGREE" was 0.97 or greater and 0.98 or less. The evaluation was "A".

The target value of the height range A1 for which the illuminance ratio is 0.99 or greater is ±0.25 mm or greater. The height range A1 with an illuminance ratio of 0.99 or greater for the "CONVENTIONAL DEGREE" indicated in Table of FIG. 9 is −0.26 mm and 0.33 mm or less. The height range A1 with an illuminance ratio of 0.99 or greater "INCREASED DEGREE" was −0.26 mm or greater and 0.33 mm or less. There was no change between "CONVENTIONAL DEGREE" and "INCREASED DEGREE". The evaluation was "A".

Five Times Tolerance in Direction (ΔW) Orthogonal to Optical Axis of Rod Lens

The target value of the main-scanning minimum illuminance ratio is, for example, 0.9 or greater. In "CONVENTIONAL DEGREE" in table, the main-scanning minimum illuminance ratio is, for example, about 0.97. The main-scanning minimum illuminance ratio for "INCREASED DEGREE" was 0.97 or greater and 0.98 or less. The evaluation was "A".

The target value of the height range A1 for which the illuminance ratio is 0.99 or greater is ±0.25 mm or greater. The height range A1 with an illuminance ratio of 0.99 or greater for the "CONVENTIONAL DEGREE" as indicated in Table of FIG. 9 is −0.26 mm and 0.33 mm or less. The height range A1 with an illuminance ratio of 0.99 or greater "INCREASED DEGREE" was 0 mm. The target value of ±0.25 mm or greater refers to 0.25 mm or greater and −0.25 mm or less. The evaluation was "C".

As a result of the above-described influence prediction, it has been found that the optical characteristics of the lighting device 400 are unaffected by an increase in the diameter tolerance of ±0.1 to ±0.5, which is five times greater if the shift amount of the rod lens 450 in the direction ΔW orthogonal to the optical axis is reduced. In other words, the diameter tolerance of the rod lenses 450 may be increased. This allows for the relaxation of the dimensional accuracy of the rod lenses 450. This further enables a lower manufacturing cost for the rod lenses 450.

FIG. 10 is an illustration of a rod lens 450B that is misaligned from the reference position of the rod lens 450 in the direction ΔW orthogonal to the optical axis. The rod lens 450B that is misaligned in the direction ΔW orthogonal to the optical axis causes light to bend. This causes the position onto which light transmitted through the rod lenses 450B is emitted to be misaligned upward in the Z-axis direction, from that of the rod lens 450 at the reference position.

In the lighting device 400 as illustrated in FIG. 6, the rod lens 450 is positioned so as to be in contact with the lens contact surfaces 411 and 412 of the side plate 410. The rod lens 450 contacting the lens contact surface 411 parallel to the X-axis direction as viewed in the Y-axis direction restricts the movement of the rod lens 450 in the Z-axis direction. Further, the rod lens 450 contacting the lens contact surface 412 parallel to the Z-axis direction as viewed in the Y-axis direction restricts the movement of the rod lens 450 in the X-axis direction. In other words, the rod lens 450 in contact with the lens contact surfaces 411 and 412 allows the movement in the direction ΔV along optical axis and restricts the movement in the direction ΔW orthogonal to the optical axis.

Advantageous Effects

In the lighting device 400, the rod lens 450 is positioned in contact with the lens contact surface 411 extending in the X-axis direction intersecting the optical axis and the lens contact surface 412 extending in the Z-axis direction intersecting the optical-axis and the X-axis direction. This arrangement restricts the movement of the rod lenses 450 in the direction ΔW orthogonal to the optical axis, thus maintaining a higher accuracy level of the relative position between the white LED boards 470 and the rod lenses 450. In the lighting device 400, supporting the rod lenses 450 in contact with the lens contact surfaces 411 and 412 maintains a higher level of accuracy of the positions of the rod lenses 450. This reduces or prevents an increase in person-hour for adjustment of the relative position between the white LED boards 470 and the rod lenses 450. In the lighting device 400, the rod lenses 450 have a diameter tolerance that is five times higher than the conventional degree. The lighting device 400 prevents an increase in cost for manufacturing the rod lenses 450.

The lens contact surface 411 disposed in the X-axis direction in the lighting device 400 restricts the movement of the rod lenses 450 in a direction parallel to the image surface of the sheet 100.

The lens contact surface 412 disposed in the Z-axis direction in the lighting device 400 restricts the movement of the rod lenses 450 in a direction parallel to the image surface of the sheet 100.

The lens contact surfaces 411 and 412 orthogonal to each other in the lighting device 400 restrict the movement of the rod lenses 450 in two orthogonal directions.

Image Forming Apparatus

Figure 11:
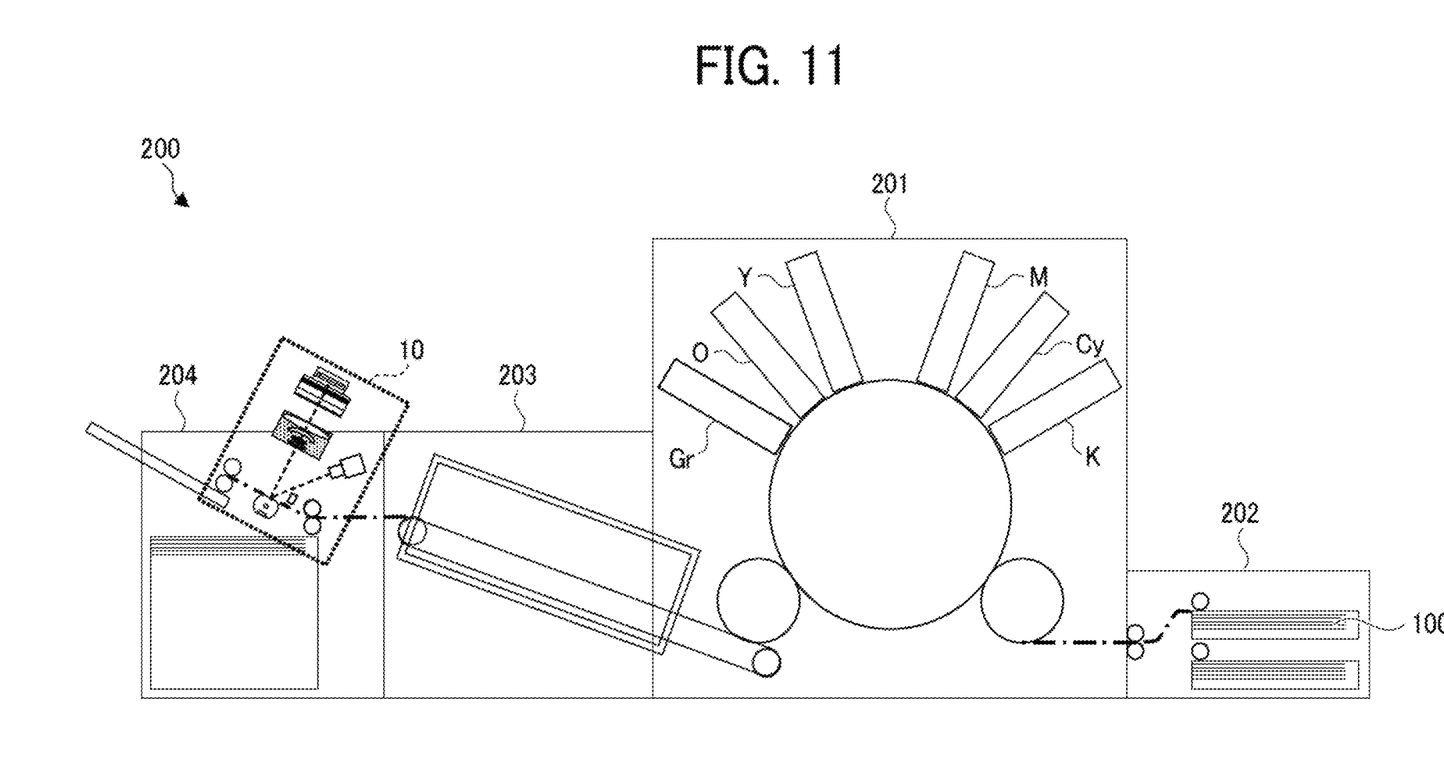
FIG. 11 is a diagram of an image forming apparatus according to an embodiment of the present disclosure.

An image forming apparatus is described with reference to FIG. 11. FIG. 11 is a diagram of an image forming apparatus according to an embodiment of the present disclosure. The image forming apparatus 200 in FIG. 11 is an inkjet image forming apparatus. The image forming apparatus 200 includes an image forming device 201, a sheet feeder 202, a dryer 203, and a sheet ejection device 204. The image forming apparatus 200 includes the colorimeter 10 described above. The image forming apparatus 200 incorporating the colorimeter 10 allows in-line acquisition of the spectral characteristics and adjustment of the image forming conditions.

The image forming device 201 includes multiple inkjet heads Gr, O, Y, M, Cy, and K. The inkjet head Gr discharges green ink. The inkjet head O discharges orange ink. The inkjet head Y discharges yellow ink. The inkjet head M discharges magenta ink. The inkjet head Cy discharges cyan ink. The inkjet head K discharges black ink.

The sheet feeder 202 stores sheets 100 as objects. The sheet feeder 202 supplies the sheet 100 to the image forming device 201.

Based on the image information, the image forming device 201 discharges ink of a corresponding color onto the sheet 100. The ink discharged from the inkjet is attached to the sheet 100 to form a visible image. The image forming device 201 supplies the sheet 100 coated with the ink to the dryer 203.

The dryer 203 dries the ink while conveying the sheet 100. The dryer 203 conveys the dried sheet 100 to the sheet ejection device 204. The sheet ejection device 204 ejects the sheet 100. In at least one example, the sheet ejection device 204 stores the sheet 100 in a stacker.

The sheet ejection device 204 includes the colorimeter 10. The colorimeter 10 is disposed so as to face an image surface of the sheet 100. The image surface of the sheet 100 is a surface to which the ink adheres. The colorimeter 10 operates when the image forming apparatus 200 is activated, when the paper type of the sheet 100 is changed, and when a periodic inspection is performed. For example, periodic inspection is performed after a certain period of operation.

The colorimeter 10 acquires the spectral characteristics of the image data of the sheet 100 being conveyed. The colorimeter 10 monitors color unevenness and color variation in the image surface of the sheet 100 based on the acquired data relating to the spectral characteristics.

The data acquired by the colorimeter 10 is output to the controller of the image forming apparatus 200. The controller of the image forming apparatus 200 adjusts the amount of ink to be discharged from the inkjet head based on the monitoring results of the colorimeter 10. The controller of the image forming apparatus 200 adjusts the image forming conditions and the imaging conditions based on the monitoring results of the colorimeter 10. The controller of the image forming apparatus 200 serves as an image evaluation apparatus, which serves to increase color reproducibility.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Although the first direction is described as a direction along the Y-axis direction in the embodiment described above, the first direction is not limited to the Y-axis direction and may be another direction. Further, although the third direction is described as a direction along the X-axis direction in the embodiment described above, the third direction is not limited to the X-axis direction and may be another direction.

Further, although the fourth direction is described as a direction along the Z-axis direction in the embodiment described above, the fourth direction is not limited to the Z-axis direction and may be another direction. Although the fourth direction is described as a direction orthogonal to the third direction when viewed from the first direction, the fourth direction is not limited to the direction orthogonal to the third direction and may be a direction crossing the third direction.

In the above-described embodiment, the second direction is described as a direction tilted at 45 degrees with respect to the reference surface of the sheet 100, but the second direction is not limited to a direction tilted at 45 degrees with respect to the reference surface, and may be another direction. The second direction may be, for example, a direction orthogonal to the reference surface of the sheet 100 when viewed in the first direction.

In the above-described embodiment, the fifth direction is described as a direction orthogonal to the optical axis, but the fifth direction is not limited thereto. The fifth direction may be, for example, a direction intersecting the optical axis when viewed from the first direction.

In the above-described embodiment, the lens contact surfaces 411 and 412 are described as being disposed orthogonal to each other, but the lens contact surfaces 411 and 412 are not limited to being orthogonal to each other, and may intersect at other angles.

Although the image forming apparatus 200 including the image reading apparatus having the light device has been described in the above-described embodiment, the lighting device and the image reading apparatus may be incorporated in other apparatuses other than the image forming apparatus.

In the above-described embodiment, the configuration in which the lighting device includes multiple illumination units each including the linear light source and the rod lens is exemplified, but the lighting device may include one illumination unit. In addition, the lighting device may include three or more illuminators.

Aspects of the present invention are as follows.

Aspect 1

A lighting device includes: a linear light source extending in a first direction and configured to emit light in a second direction intersecting the first direction to an object; a rod lens apart from the linear light source in the second direction and extending in the first direction, the rod lens configured to transmit the light emitted from the linear light source; and a support portion supporting the rod lens and having: a first surface extending in a third direction intersecting the second direction; and a second surface extending in a fourth direction intersecting the second direction and the third direction. The rod lens is in contact with each of the first surface and the second surface.

Aspect 2

In the lighting device according to Aspect 1, the second direction is tilted by 45 degrees with respect to a reference surface of the object.

Aspect 3

In the lighting device according to Aspect 1, the support portion includes paired side plates apart from each other in the first direction.

Aspect 4

In the lighting device according to Aspect 1, the third direction is parallel to a reference surface of the object.

Aspect 5

In the lighting device according to Aspect 1, the fourth direction is orthogonal to the third direction.

Aspect 6

The lighting device according to Aspect 1, further includes: multiple linear light sources including the linear light source; and multiple rod lenses including the rod lens. The multiple linear light sources and the multiple rod lenses respectively form multiple illumination units, and the multiple illumination units are apart from each other in the third direction parallel to a reference surface of the object.

Aspect 7

In the lighting device according to Aspect 1, the linear light source includes multiple white LED light sources arranged in the first direction.

Aspect 8

The lighting device according to Aspect 1, further includes a lens retainer attached to the support portion to support the rod lens with the support portion. The lens retainer includes a third surface extending in a fifth direction intersecting the third direction and the fourth direction, the rod lens contacting the third surface.

Aspect 9

An image reading apparatus includes: the lighting device according to Aspect 1 configured to emit light to the object; and a light receiver configured to receive light reflected from the object.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A lighting device comprising:
   a linear light source extending in a first direction and configured to emit light in a second direction intersecting the first direction to an object;
   a rod lens apart from the linear light source in the second direction and extending in the first direction, the rod lens configured to transmit the light emitted from the linear light source;
   a support portion supporting the rod lens and having:
      a first surface extending in a third direction intersecting the second direction; and
      a second surface extending in a fourth direction intersecting the second direction and the third direction,
   wherein the rod lens is in contact with each of the first surface and the second surface, and the support portion includes a pair of side plates apart from each other in the first direction; and
   a rod lens retainer attached to the support portion to support the rod lens with the support portion, wherein the rod lens retainer is provided for each of the pair of side plates.

2. The lighting device according to claim 1, wherein the second direction is tilted by 45 degrees with respect to a reference surface of the object.

3. The lighting device according to claim 1, wherein the third direction is parallel to a reference surface of the object.

4. The lighting device according to claim 1, wherein the fourth direction is orthogonal to the third direction.

5. The lighting device according to claim 1, further comprising:
   multiple linear light sources including the linear light source; and
   multiple rod lenses including the rod lens,
   wherein the multiple linear light sources and the multiple rod lenses respectively form multiple illumination units, and
   the multiple illumination units are apart from each other in the third direction parallel to a reference surface of the object.

6. The lighting device according to claim 1, wherein the linear light source includes multiple white LED light sources arranged in the first direction.

7. The lighting device according to claim 1, wherein the rod lens retainer includes a third surface extending in a fifth direction intersecting the third direction and the fourth direction, and the rod lens contacts the third surface.

8. An image reading apparatus comprising:
   the lighting device according to claim 1 configured to emit light to the object; and
   a light receiver configured to receive light reflected from the object.

9. The lighting device according to claim 1, further comprising a pressing member configured to press the rod lens retainer against the rod lens.

10. The lighting device according to claim 9, wherein the pressing member includes a spring member.

* * * * *